(12) United States Patent
Wertz

(10) Patent No.: US 11,434,821 B2
(45) Date of Patent: Sep. 6, 2022

(54) FEATURE BASED COOLING USING IN WALL CONTOURED COOLING PASSAGE

(71) Applicant: GENERAL ELECTRIC COMPANY, Schenectady, NY (US)

(72) Inventor: Aaron Joseph Wertz, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/314,619

(22) Filed: May 7, 2021

(65) Prior Publication Data

US 2021/0262387 A1 Aug. 26, 2021

Related U.S. Application Data

(62) Division of application No. 15/390,084, filed on Dec. 23, 2016, now Pat. No. 11,015,529.

(51) Int. Cl.
| | |
|---|---|
| *F02C 7/12* | (2006.01) |
| *F23R 3/00* | (2006.01) |
| *F23R 3/06* | (2006.01) |
| *F01D 5/18* | (2006.01) |
| *F01D 25/12* | (2006.01) |
| *F01D 5/28* | (2006.01) |

(52) U.S. Cl.
CPC .............. *F02C 7/12* (2013.01); *F01D 5/186* (2013.01); *F01D 5/187* (2013.01); *F01D 5/288* (2013.01); *F01D 25/12* (2013.01); *F23R 3/002* (2013.01); *F23R 3/005* (2013.01); *F23R 3/06* (2013.01); *F05D 2230/30* (2013.01); *F05D 2260/20* (2013.01); *F23R 2900/00018* (2013.01)

(58) Field of Classification Search
None
See application file for complete search history.

(56) References Cited

U.S. PATENT DOCUMENTS

| | | |
|---|---|---|
| 4,109,459 A | 8/1978 | Ekstedt et al. |
| 4,653,279 A | 3/1987 | Reynolds |
| 4,689,961 A | 9/1987 | Stratton |
| 4,863,538 A | 9/1989 | Deckard |
| 5,181,379 A | 1/1993 | Wakeman et al. |
| 5,460,758 A | 10/1995 | Langer et al. |
| 5,775,108 A | 7/1998 | Ansart et al. |
| 6,145,301 A | 11/2000 | Gonidec et al. |
| 6,164,075 A | 12/2000 | Igarashi |
| 6,205,789 B1 | 3/2001 | Patterson et al. |
| 6,408,629 B1 | 6/2002 | Harris et al. |

(Continued)

FOREIGN PATENT DOCUMENTS

| | | |
|---|---|---|
| CN | 101650033 A | 2/2010 |
| CN | 108458366 A | 8/2018 |

(Continued)

*Primary Examiner* — Ehud Gartenberg
*Assistant Examiner* — Jacek Lisowski
(74) *Attorney, Agent, or Firm* — McGarry Bair PC

(57) ABSTRACT

A combustion liner or component produced through the use of additive manufacturing techniques. The combustion liner or other component may be formed having a feature based optimized cooling circuit at least partially embedded in the thickness of the material. The internal cooling circuit, may be used, along with other benefits, to control the temperature of the component and prevent hot-spots and uneven heat distribution across the surface of the component.

19 Claims, 6 Drawing Sheets

(56) References Cited

U.S. PATENT DOCUMENTS

| | | |
|---|---|---|
| 6,513,331 B1 | 2/2003 | Brown et al. |
| 6,546,627 B1 | 4/2003 | Sekihara |
| 6,655,149 B2 | 12/2003 | Farmer et al. |
| 7,748,222 B2 | 7/2010 | Bernier et al. |
| 9,222,674 B2 | 12/2015 | Cunha et al. |
| 2009/0013530 A1 | 1/2009 | Rudrapatna |
| 2010/0037620 A1 | 2/2010 | Chila |
| 2014/0007580 A1 | 1/2014 | Richardson |
| 2014/0216042 A1 | 8/2014 | Hanson |
| 2014/0338347 A1 | 11/2014 | Gage et al. |
| 2015/0330635 A1 | 11/2015 | Pidcock |
| 2016/0003056 A1 | 1/2016 | Xu |
| 2016/0025006 A1 | 1/2016 | Propheter-Hinckley |
| 2016/0033129 A1 | 2/2016 | Burd |
| 2016/0131364 A1 | 5/2016 | Burd |
| 2016/0178199 A1 | 6/2016 | Burd |
| 2016/0209033 A1 | 7/2016 | Burd |
| 2016/0238253 A1 | 8/2016 | Moura |

FOREIGN PATENT DOCUMENTS

| | | |
|---|---|---|
| EP | 1496204 A1 | 1/2005 |
| EP | 2489939 A1 | 8/2012 |
| EP | 2905538 A1 | 8/2015 |
| JP | 2000-145479 A | 5/2000 |
| JP | 2004-003835 A | 1/2004 |
| KR | 10-1157435 B1 | 6/2012 |
| WO | 98/36220 A1 | 8/1998 |
| WO | 2013/120999 A1 | 8/2013 |
| WO | 2016/136521 A1 | 9/2016 |
| WO | 2016/193589 A1 | 12/2016 |

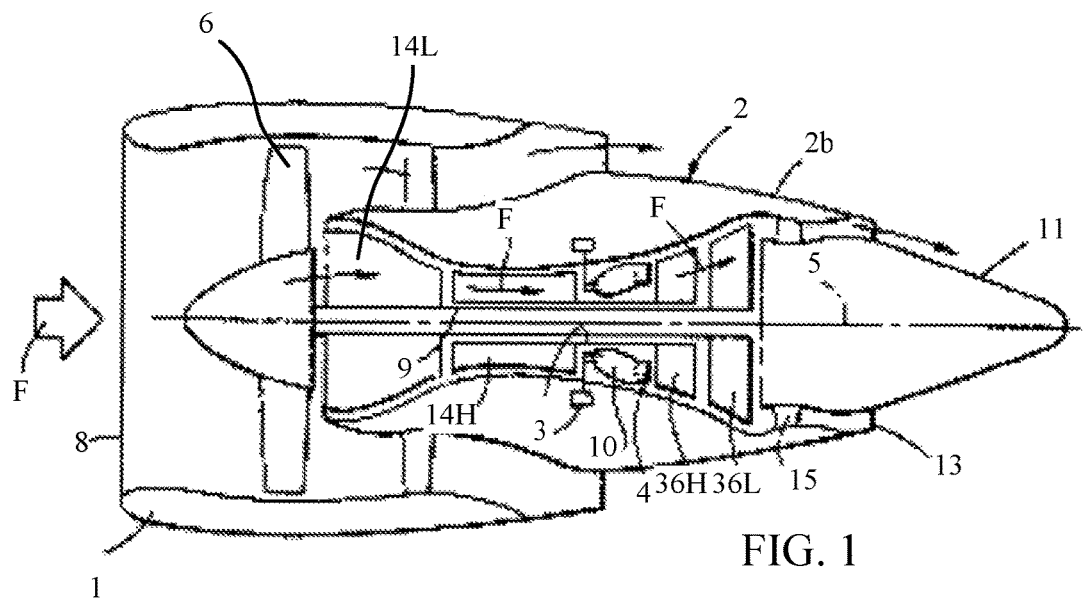
FIG. 1
PRIOR ART
FIG. 2
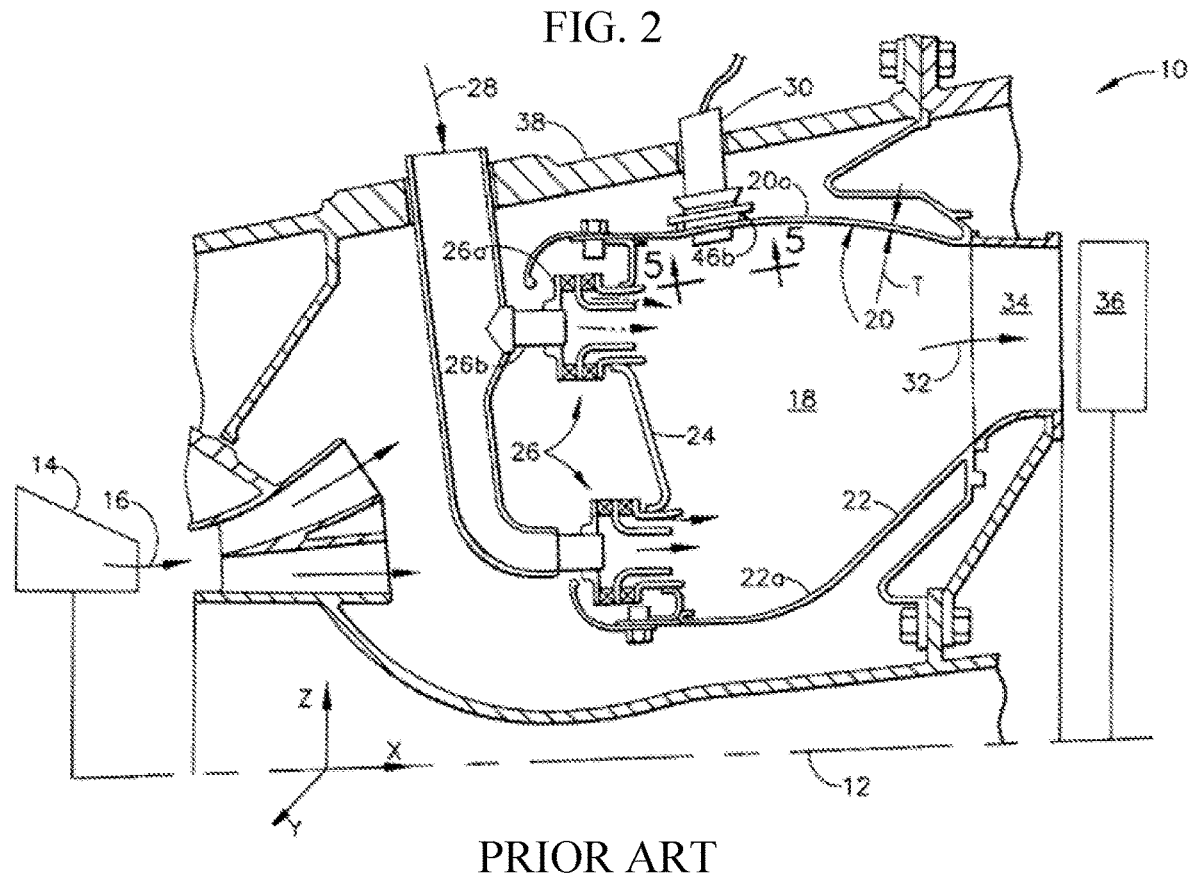
PRIOR ART

FEATURE BASED COOLING USING IN WALL CONTOURED COOLING PASSAGE

CROSS REFERENCE TO RELATED APPLICATIONS

This application is a divisional application of U.S. patent application Ser. No. 15/390,084, filed Dec. 23, 2016, now issued as U.S. Pat. No. 11,015,529, issued Jun. 25, 2021, which is incorporated herein by reference in its entirety.

TECHNICAL FIELD

This disclosure relates to a method and system for feature based cooling, specifically to a method and system for feature based cooling using an in wall contoured cooling passage.

BACKGROUND

Gas turbine engines generally include at least one compressor to pressurize air to be channeled into a combustor, the engine may include at least one combustor in which at least a portion of the channeled pressurized air is mixed with fuel and ignited, the hot gasses from the compressor flow downstream through at least one turbine section. Each turbine section has rotating blades rotating about an axis and contained within an engine housing. The turbine section or sections may power any one of the compressor, a fan, a shaft, and/or may provide thrust through expansion through a nozzle, for example.

In general, a combustor may include a combustor liner. The combustor, and combustion liner must provide stable combustion in the high flow rate provided from the compressor. A combustor may include several cylindrical combustion chambers or may be formed as an annular structure around the axis of the turbine. The combustion liner may house at least one of an injector having an air swirler and a fuel injector or a fuel nozzle. The combustion liner may be formed as a single layer, a substrate, or as a multi-layered structure having an annular cavity between the multiple layers.

The combustor liner may include a series of dilution holes for providing control of the air supplied to the combustion chamber and/or to provide for a more uniform combustion. The liner may further include perforations or holes for cooling by providing film, impingement, or bore cooling. One example of a combustion liner having holes for impingement cooling is disclosed in U.S. Pat. No. 6,513,331 B1, the contents of which is hereby incorporated by reference. In most cases a portion of air from the compressor is channeled externally to remove heat and cool the external side of the combustion liner or to provide air to the above-mentioned dilution holes; further, air may also be channeled inside a two layered combustion liner to provide dilution air and/or to cool the liner. One example of a dual walled combustor is disclosed in U.S. Pat. No. 4,109,459 A, the contents of which is hereby incorporated by reference.

The combustor liner of a turbine must be able to withstand the forces created by the pressure differential caused by the combustion in the combustion chamber. Further, a combustor liner must be able to withstand thermal stresses due to high temperatures and large temperature fluctuations. As the pressure ratio, and efficiency, of turbines has increased, the thermal stresses a combustion liner and other hot sections of the turbine are exposed to has also increased. Accordingly, in combination with manufacturing a liner from a high-temperature resistant material, effective cooling of the combustion liner wall and other components has become increasingly important and challenging. To counteract the radiation and convection of heat to the lining during combustion, several heat removal techniques have been employed in the past; fluid cooling is generally employed to prolong the life of the liner. Most recently, small holes have been drilled though the liner at angles optimized to remove heat and provide a thermal barrier to the liner wall. Frequently, along with the abovementioned fluid cooling, protective coatings are applied to the wall of the combustion liner to further improve the liners resistance to thermal stresses.

Combustion liners and other components in the turbine may experience high temperature areas or hot-spots in areas of the components downstream of various features, interruptions, and/or discontinuities in the surface of the component. For example, igniter towers, dilution holes, weld joints, and/or borescope holes, may disrupt the flow of cooling fluid over the surface of a combustion liner. Hot spots are often caused by the disruption in the cooling fluid film formed on the surface of components due to features or interruptions on the surface of components, example of which are mentioned above. Thus, there is a need to effectively cool areas of components that experience an interruption in the flow of cooling air.

BRIEF DESCRIPTION OF THE INVENTION

Through the use of additive manufacturing techniques, a combustion liner or other component may be formed having a feature based optimized cooling circuit. The internal cooling circuit may be used, along with other benefits, to control the temperature of the component and prevent hot-spots and uneven heat distribution across the surface of the component. Accordingly, the life of the component can be increased. Additional advantages and novel features of these aspects will be set forth in part in the description that follows, and in part will become more apparent to those skilled in the art upon examination of the following or upon learning by practice of the disclosure.

In another aspect, the disclosure relates to a method for cooling a component, the method comprising forming a component of a material having a thickness, the component having at least a first side, and a second side, forming at least one cooled feature in the material passing from at least the first side to the second side, the cooled feature having a boundary within the material thickness, defining a periphery of the cooled feature, and forming at least one first opening in fluid communication with and passing from the first side to the second side forming a cooling passage, wherein the cooling passage is formed with a curved portion such that the curved portion of the cooling passage at least partially follows the periphery of the cooled feature.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a cross-section view depicting a conventional turbine engine;

FIG. 2 is a cross-section view depicting an example combustor in accordance with one aspect of the disclosure;

DETAILED DESCRIPTION

Figure 3:
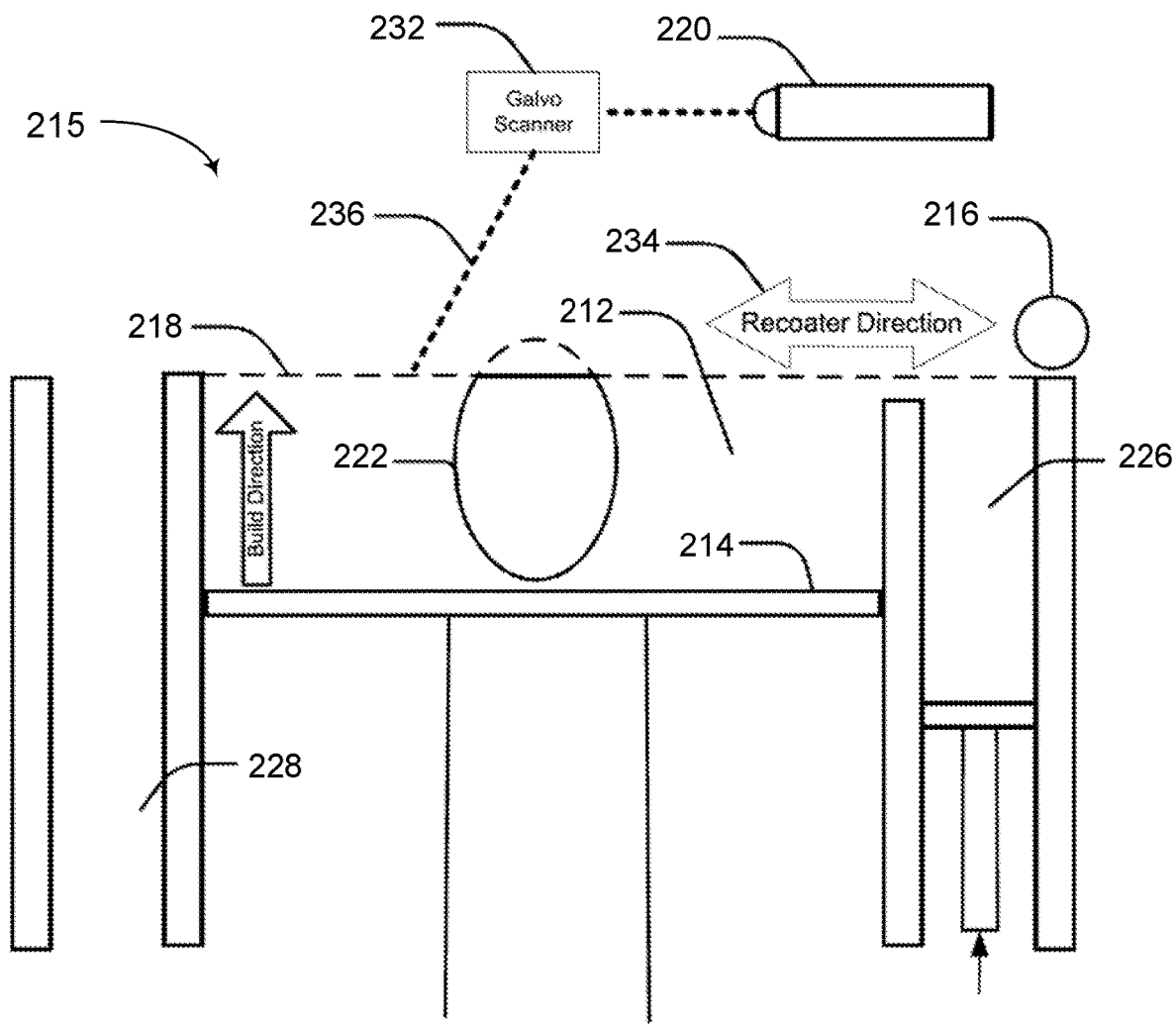
FIG. 3 is schematic diagram showing an example of a conventional apparatus for additive manufacturing.

As shown in FIG. 1, an example of a turbine gas engine may be a turbofan engine that is symmetric about an axis 5. The engine may include a casing 1 having an inlet 8, a bay 2, a fan 6, a low pressure compressor portion 14L, and a high pressure compressor portion 14H. The engine may further include a combustor 10, having a fuel inlet 3 and an exit 4. The compressed air F flowing through the compressor and having traveled though the combustor 10 is expanded through the high pressure turbine portion 36H and low pressure turbine portion 36L. At least one of the turbine portions drive both the fan 6 and compressor portions through at least one shaft 9. The flow F traveling though the engine may exit at a fan exit, a bay exit 2b and/or at the exhaust exit 13, traveling over tail portion 11.

While the majority of the description above describes a component in a turbofan type turbine, the above disclosure is intended as an example and not as an exclusive description. The following disclosure is applicable to all types of components (e.g. baffles, domes, fuel nozzles). The following detailed description sets would allow one of ordinary skill to apply the internal cooling passages to a wide variety of components and as such may have general application in a broad range of systems and/or a variety of commercial, industrial, and/or consumer applications.

An example of a possible combustor arrangement is shown in FIG. 2. The combustor arrangement 10 may include an inlet though which pressurized fluid 16 is provided by a compressor 14. The combustor may further include a fuel inlet 28 for providing fuel to at least one fuel nozzle 26. One example nozzle may include at least one of an injector and/or may include a swirler 26a and/or a fuel injector 26b. The fuel injector may be any one or combination of a pressure-atomizing, air blast, vaporizing, and premix/pre-vaporizing injector, for example. When pressurized air 16 and the fuel from fuel inlet 28 are mixed, a combustible mixture is formed which is ignited by ignitor 30. A combustion liner which may be composed of walls 22, 20, and 24 defines a combustion chamber 18. The combustor may be mounted inside an annular casing 38 or outer liner. The combustion chamber 18 contains and controls the abovementioned combustion of fuel and air ignited by ignitor 30. The combustion liner 22 may be a single wall, a substrate, or may comprise an inner and outer wall (e.g. a diffuser and a liner) having an annular cavity between the inner and outer walls. The combustion chamber 18 may define a full annular cavity around the axis of the turbine 5, may include multiple annular cavities, or may be comprised of several divided or separate combustion chambers around the axis of the turbine as a series of can type structures or as a cannular structure. The inner surface and/or outer surface of the combustion liner may be coated with a thermal barrier coating. A combustion liner may include an ignitor hole 46b and may include a plurality of dilution holes (not shown) and one or more boroscope holes (not shown). The combustion chamber includes an exit 34 which may provide the heated and compressed air to the turbine section 36.

Figure 4A:
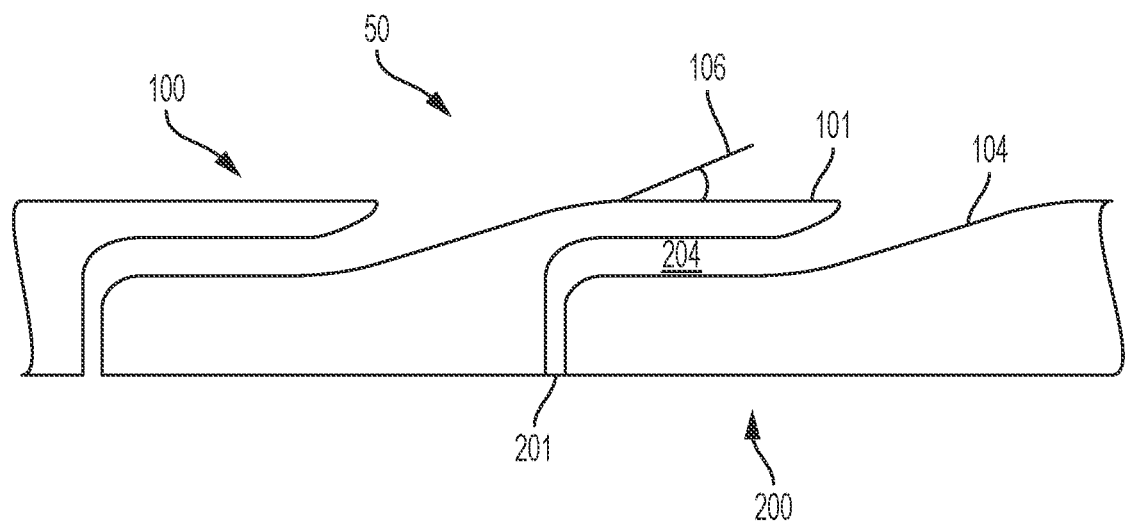
FIG. 4A is a cross-sectional view depicting cooling passages in accordance with one aspect of the disclosure.

A turbine component (e.g. a combustor liner) may further include a series of cooling holes, that may be smaller than the abovementioned dilution holes and boroscope holes. As shown in FIG. 4A, the component material may include impingement cooling holes forming a fluid communication path between the first side of the component 200 which may be a radially outer surface and may be a cold side in relation to a second side 100, the second side may be radially inner side of the component 100 which may be a hot surface in relation to the first side of the component 200. Further the cooling holes may include a cooling inlet 201, a cooling passage body 104 and a cooling passage outlet ramp 104, which may be formed at an angle 106 optimized to form a film layer on the second side 100.

The cooling passages 50 may be formed in a component using an additive manufacturing technique (AM), which may include selective laser sintering (SLS), direct metal laser sintering (DMLS) and three dimensional printing (3DP). Any of the above additive manufacturing techniques may be used to form a combustion liner or any of the abovementioned components from stainless steel, aluminum, titanium, Inconel 625, Inconel 718, Inconel 188, cobalt chrome, among other metal materials or any alloy. For example Haynes® 188, or Inconel 188 may be used to form a combustion liner using the abovementioned techniques. AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material.

FIG. 3 is schematic diagram showing a cross-sectional view of an exemplary conventional system 215 for direct metal laser sintering (DMLS) or direct metal laser melting (DMLM). The apparatus 215 builds objects, for example, the part 222, in a layer-by-layer manner by sintering or melting a powder material (not shown) using an energy beam 236 generated by a source such as a laser 220. The powder to be melted by the energy beam is supplied by reservoir 226 and spread evenly over a build plate 214 using a recoater arm 216 travelling in direction 234 to maintain the powder at a level 218 and remove excess powder material extending above the powder level 218 to waste container 228. The energy beam 236 sinters or melts a cross sectional layer of the object being built under control of the galvo scanner 232. The build plate 214 is lowered and another layer of powder is spread over the build plate and object being built, followed by successive melting/sintering of the powder by the laser 220. The process is repeated until the part 222 is completely built up from the melted/sintered powder material. The laser 220 may be controlled by a computer system including a processor and a memory. The computer system may determine a scan pattern for each layer and control laser 220 to irradiate the powder material according to the scan pattern. After fabrication of the part 222 is complete, various post-processing procedures may be applied to the part 222. Post processing procedures include removal of access powder by, for example, blowing or vacuuming. Other post processing procedures include a stress release process. Additionally, thermal and chemical post processing procedures can be used to finish the part 222.

The apparatus 215 is controlled by a computer executing a control program. For example, the apparatus 215 includes a processor (e.g., a microprocessor) executing firmware, an operating system, or other software that provides an interface between the apparatus 210 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly.

Figure 4B:
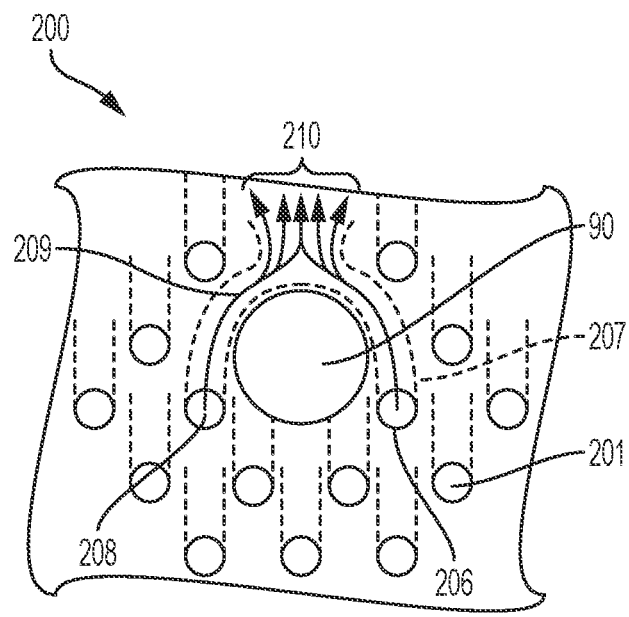
FIG. 4B is a view of a first side of a component, having feature based cooling passages and a bifurcated inlet, in accordance with one aspect of the disclosure.
Figure 4C:
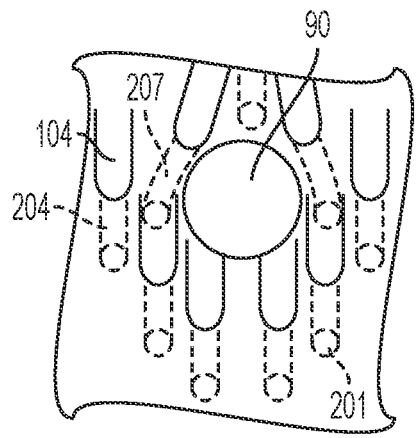
FIG. 4C is a view of a second side of a component, having feature based cooling passages, in accordance with one aspect of the disclosure.

Using the above manufacturing techniques, complex patterns may be formed within the material of a component that may not have been possible using subtractive manufacturing or molding processes. Using the above additive manufacturing process, for example, cooling passages may be formed that provide specific impingement and/or bore cooling and provide for specific control of the film of air protecting the surface of the material. Further, bore cooling, which may be referred to herein interchangeably throughout the specification as transpiration cooling, may be used to provide specific cooling pathways within the material to cool the internal structure of the material. The abovementioned cooling methods may be used either alone or in combination to cool a component material based on features on or in the component liner. For example, FIG. 4B shows a cooled feature (e.g. a discontinuity or opening) 90 which may be present on a combustor liner or in any other component within the engine. Some examples of cooled features may be an ignitor tower and/or ignitor and/or an ignitor hole, boroscope hole, injector hole, a stud, mounting point, or bolt protruding from the surface of the part, a dilution hole, or any other hole or passage. The cooled feature 90, may disrupt the fluid film flow over the surface of the part, especially at a location downstream of the fluid flow, for example. The flow inlet 201 may be located on a radially outward side of the surface 200 which may be a cold side of the surface as shown in FIG. 4A, reference 200, for example. The passage from entrance 201 to an exit 210 may have a cross-sectional view as shown in FIG. 4A, reference 104, for example. Further, as shown in FIG. 4B for example, the inlet may be bifurcated into inlets 206 and 208 on either sides of feature 90. The inlets 206 and 208 may be located upstream in a fluid flow direction on a cold side of the component. Further, the bifurcated inlets may be in fluid communication with passage 207 and a fluid exit portion 210 on a second side of the component, which may be on a hot side of the component. Each of the passages 207 in communication with the bifurcated inlets 206 and 208 may follow the boundary of the feature 90 within the liner and join to form a single outlet 210 on the second side of the feature 90, which may be a hot side. Further, as shown in FIG. 4C the inlets 201 and passage 207 may follow the boundary of the feature 90 within the component material and exit at a single exit 204 corresponding to each inlet.

Figure 5A:
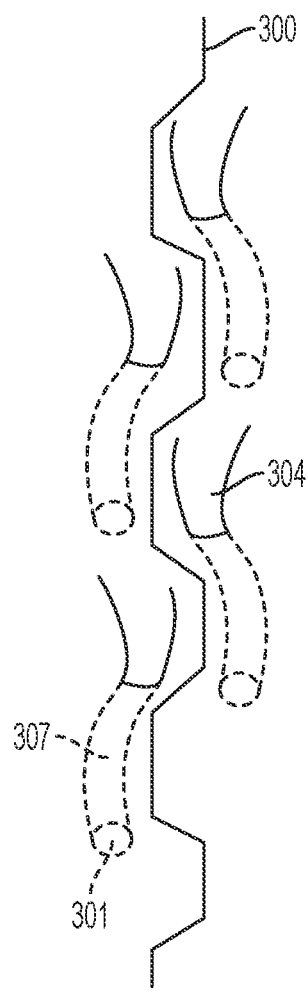
FIG. 5A is a view of a second side of a component, having feature based cooling passages in accordance with one aspect of the disclosure.
Figure 5B:
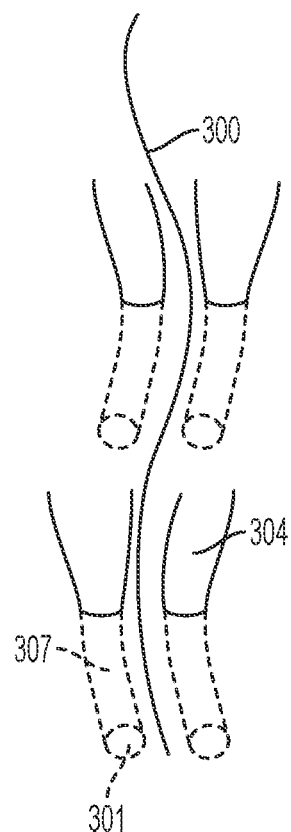
FIG. 5B is a view of a second side of a component, having feature based cooling passages in accordance with one aspect of the disclosure.

As shown in FIG. 5, the abovementioned cooled feature may further be a weld joint 300, for example. The weld joint 301 may be a weld joining a plurality of components to form a larger component. The weld joint may comprise a surface or partial weld or may penetrate entirely through the material. The weld joint 300 may include a cooling passage for bore cooling of the joint and the material bordering the joint and/or to provide film cooling to the joint. The cooling passage inlet 301 may be in fluid communication with a cooling passage outlet 104 through cooling passage 307. The cooling passage 307 may further be curved to follow the boundary of the weld joint within the material. The weld joint 300, is not limited to, and may include a curved weld joint as shown in FIG. 5B and/or may be a tooth/gear profile shaped weld joint as shown in FIG. 5A, for example. For example, as shown in FIGS. 5A and 5B, the cooling passage 307 may follow any desired shape of the weld joint 300.

Figure 6:
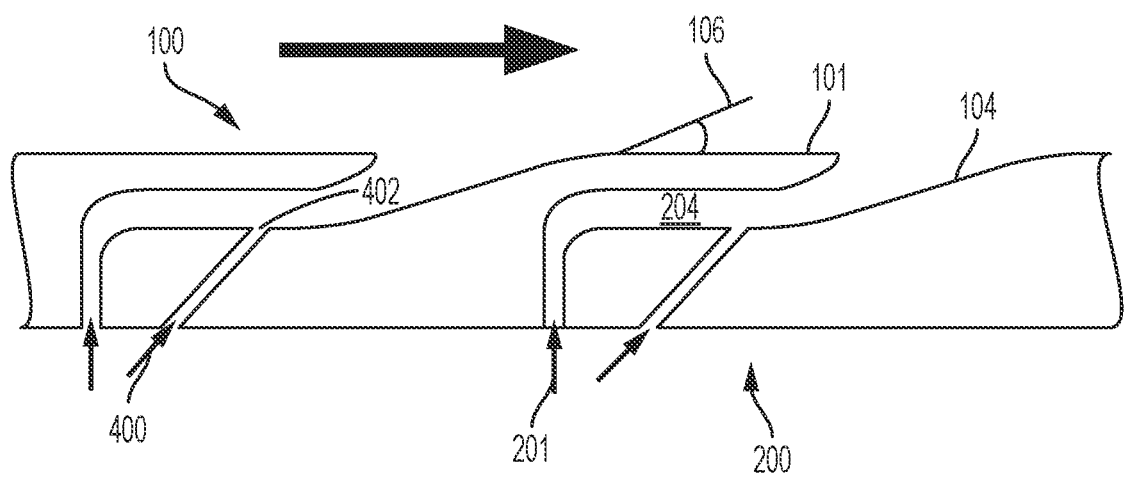
FIG. 6. is a cross-sectional view depicting cooling passages, having refresher holes, in accordance with one aspect of the disclosure.

In one aspect of the disclosure, each of the cooling holes, of which examples are shown in FIGS. 3-6 may include at least one refresher hole, the refresher hole may have a refresher hole inlet 400 and a refresher hole outlet 402 as shown in FIG. 6. The refresher holes may provide additional fluid flow to refresh the momentum of the fluid flowing along extended passages within the component material. For Example, in FIG. 6, the refresher hole outlet 402 may provide additional flow and refresh the fluid flow between the cooling inlet 201 and the cooling outlet 104. The refresher hole may extend from the cold side to a cooling passage within the material. For example, as shown in FIG. 6, the refresher hole may extend into, and be in fluid communication, with a passage 204 near an exit 104.

Figure 7:
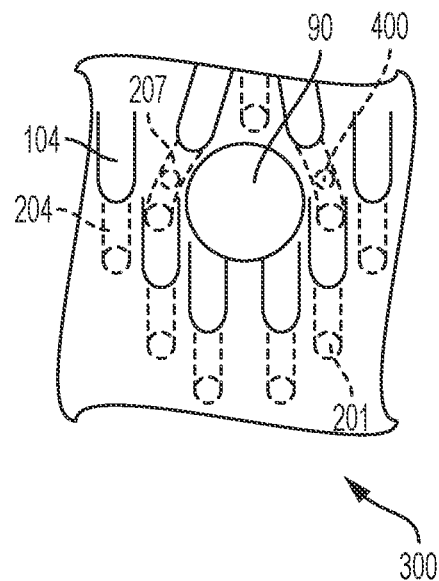
FIG. 7 is a view of a second side of a component, having feature based cooling passages similar to the passages FIG. 4B with the addition of refresher holes, in accordance with one aspect of the disclosure.
Figure 8:
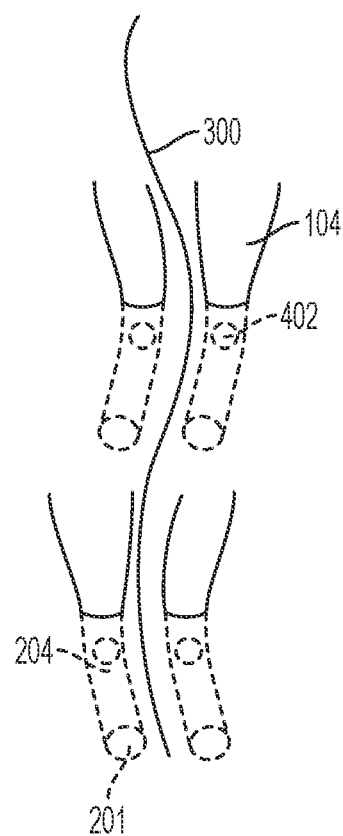
FIG. 8 is a view of a second side of a component, having feature based cooling passages similar to the passages in FIG. 5 with the addition of refresher holes, in accordance with one aspect of the disclosure.

As shown in FIGS. 7-8 any of the abovementioned cooling passages may include a refresher hole. For example, in FIG. 7, passage 204 may include a refresher hole 400. As another example, as shown in FIG. 8, a cooling passage 204 proximate to a weld joint or seam 300 may also include a refresher hole 402.

Frequently a thermal barrier coating (TBC) may be desired on components inside an engine. As an example, a TBC may be used on the surfaces of a combustion liner to improve performance of the material. Example TBC coatings may comprise yttria-stabilized zirconia (YSZ), gadolinium zirconate, rare earth zicronates, such as LZ, which may include additional layers comprising alumina or mullite, ceria, YSZ, rare earth oxides, "high y" coatings, and metal glass composites. The TBC coatings may further be a substrate further comprising a bond coat and/or thermally grown oxide layer. Further, any other type of coating may be used on the material. For example, a corrosion inhibitor may be used. The coatings may be applied using methods such as vapor deposition and/or applied plasma spray methods, for example. Forming any coating on a component may cause problems with the coating clogging the abovementioned cooling inlets, outlets, and passages.

Figure 9:
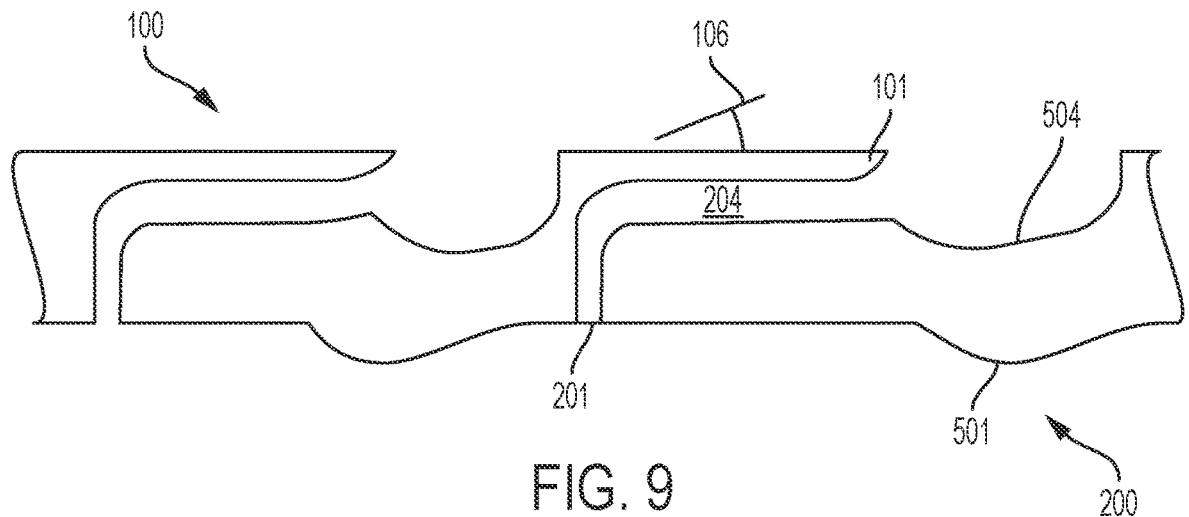
FIG. 9 is a cross-sectional view depicting a cooling passage, having an accumulation trench in accordance with one aspect of the disclosure.
Figure 10:
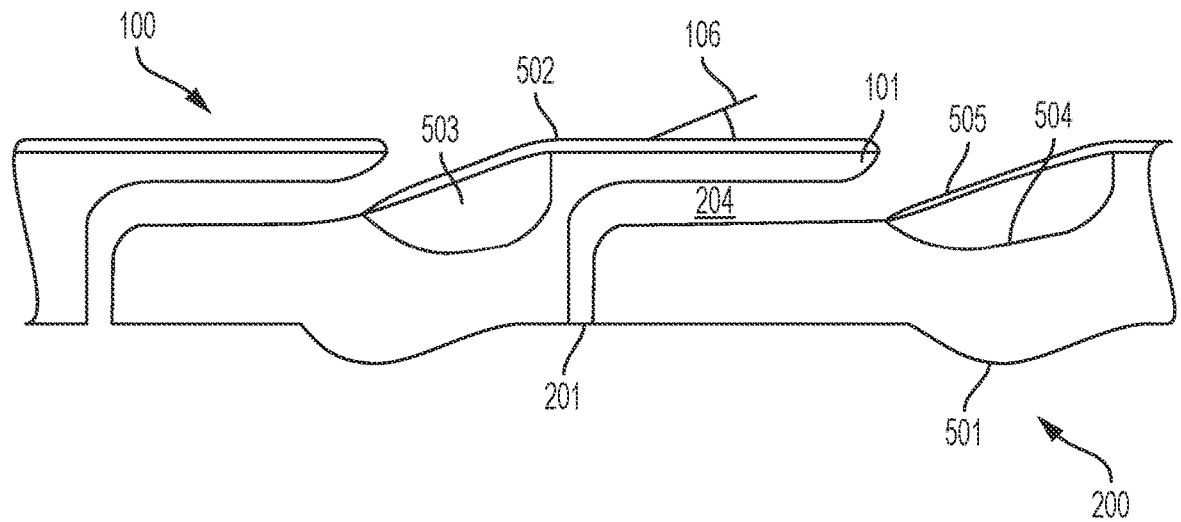
FIG. 10 is a cross-sectional view depicting the cooling passage of FIG. 9, having a coating in accordance with one aspect of the disclosure.

As shown in FIG. 9, In one aspect, an accumulation trench 504 may be formed in the material to provide containment of the coating used or TBC used during a coating process. The accumulation trench 504 may be provided at such a depth and geometry that when a coating is provided to the surface 100, the accumulation of the coating results in the desired finished surface geometry as shown in FIG. 10. As another example the depth of trench 504, may be optimized to that when a coating is added to the surface of the second side 100 the profile of the surface 100 substantially matches the cross sectional view shown in FIG. 3. Further, in order to maintain a minimum wall thickness the first side 200 may include an offset 501. As shown in FIG. 10, the coating 502 or coatings, may be applied so as to accumulate in the trench 504, providing and filling the accumulation trench at a height 503 to provide the desired angle 106 of flow at the exit ramp 505 of the cooling hole.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

What is claimed is:

1. A method for cooling a component, the method comprising:
    forming the component of a material having a thickness, the component having at least a first side, and a second side;
    forming at least one cooled feature in the material passing from at least the first side to the second side, the least one cooled feature having a boundary within the material thickness, defining a periphery of the least one cooled feature;
    forming at least one first opening in fluid communication with and passing from the first side to the second side forming a cooling passage, wherein the cooling passage is formed with a curved portion such that the curved portion of the cooling passage at least partially follows the periphery of the least one cooled feature, and
    providing a refresher portion, wherein the method of providing the refresher portion comprises:
    providing a refresher inlet having an opening on the first side of the component;
    providing a refresher outlet having an opening in the cooling passage; and
    providing a refresher passage in fluid communication with the cooling passage.

2. The method of claim 1, wherein the least one first opening is formed as a plurality of openings spaced from one another.

3. The method of claim 1, further comprising forming the cooling passage as a plurality of cooling passages and forming the plurality of cooling passages with a junction, wherein the plurality of cooling passages join to form a single cooling passage at the junction.

4. The method of claim 1, further comprising providing the cooling passage with an outlet ramp, wherein the outlet ramp forms an oblique angle with a surface of the component.

5. The method of claim 1, further comprising providing the cooling passage with an accumulation trench, wherein the accumulation trench protrudes into the thickness of the material in a direction from the second side of the material towards the first side of the material and forms a cavity for accumulation of a coating.

6. The method of claim 1, further comprising forming at least a portion of the component through an additive manufacturing process.

7. The method of claim 6, further comprising forming at least a portion of the cooling passage through the additive manufacturing process.

8. The method of claim 6, further comprising forming the at least a portion of the component through the additive manufacturing process including at least one of selective laser sintering, direct metal laser sintering, selective laser melting, direct laser melting, or three-dimensional printing.

9. The method of claim 8, further comprising forming the at least a portion of the component through the direct metal laser sintering.

10. The method of claim 1, further comprising coating at least a portion of the component with a thermal barrier coating.

11. The method of claim 1, further comprising forming the at least one cooled feature, wherein the at least one cooled feature includes at least one of an ignitor tower, an ignitor, an ignitor hole, a borescope hole, an injector hole, a stud, a mounting point, a bolt, a dilution hole, or a weld joint.

12. The method of claim 1, further comprising forming at least a portion of the cooling passage perpendicular to a surface on the first side.

13. The method of claim 1, further comprising providing at least a portion of the component within a combustor liner.

14. The method of claim 1, further comprising forming the component with at least one weld joint passing at least partially from the first side to the second side.

15. The method of claim 14, further comprising forming the boundary located within the thickness of the material, and defining the periphery of the at least one weld joint.

16. The method of claim 15, further comprising forming the curved portion in the cooling passage to follow the boundary of the at least one weld joint.

17. The method of claim 16, further comprising forming the first side opposite the second side and providing the cooling passage with an outlet ramp, wherein the outlet ramp forms an oblique angle with a surface of the component.

18. The method of claim 16, further comprising providing the cooling passage with an accumulation trench, wherein the accumulation trench protrudes into the thickness of the material in a direction from the second side of the material towards the first side of the material and forms a cavity for accumulation of a coating.

19. The method of claim 16, further comprising forming the first side opposite the second side, and at least a portion of the cooling passage perpendicular to a surface of the first side.

\* \* \* \* \*